4 Sheets—Sheet 1.

O. C. GREEN.
WHEEL-CULTIVATOR.

No. 175,077.  Patented March 21, 1876.

WITNESSES
W. H. Pearce
Henry Tanner

INVENTOR
Oliver C. Green
By Knight Bros. Attorneys

N. PETERS, PHOTO-LITHOGRAPHER, WASHINGTON, D.C.

O. C. GREEN.
WHEEL-CULTIVATOR.
No. 175,077.  Patented March 21, 1876.
4 Sheets—Sheet 2.
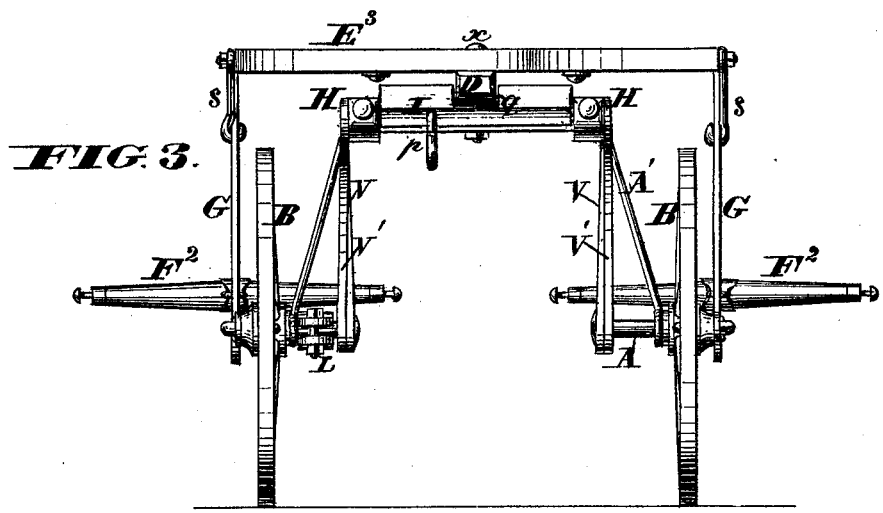
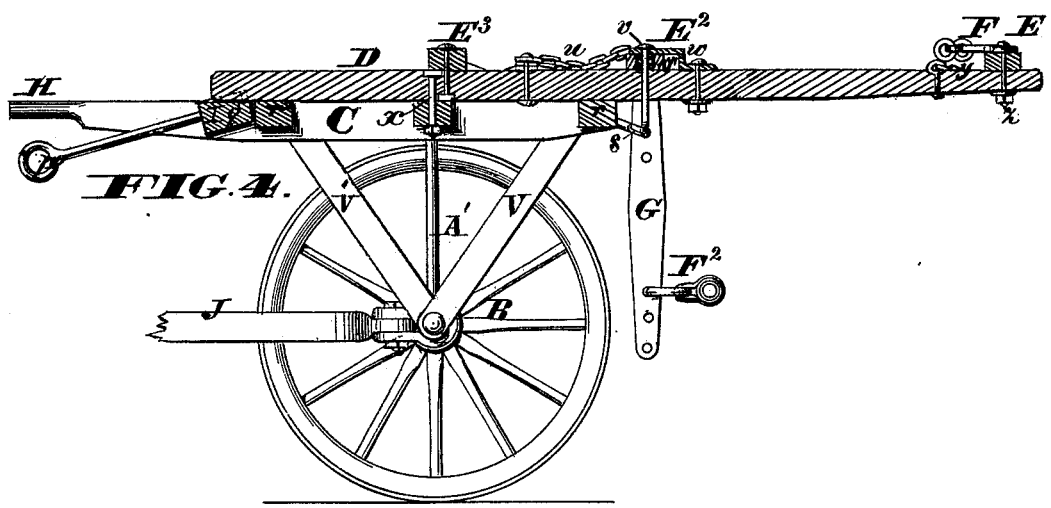
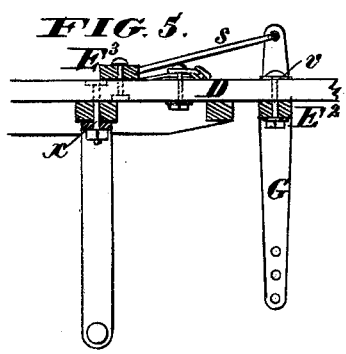
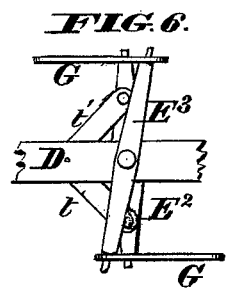
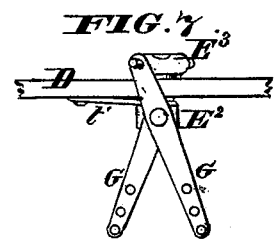
WITNESSES
W. H. Pearce
Henry Tanner
INVENTOR
Oliver C. Green
By Knight Bros. Attorneys 4 Sheets—Sheet 3.
O. C. GREEN.
WHEEL-CULTIVATOR.
No. 175,077. Patented March 21, 1876.
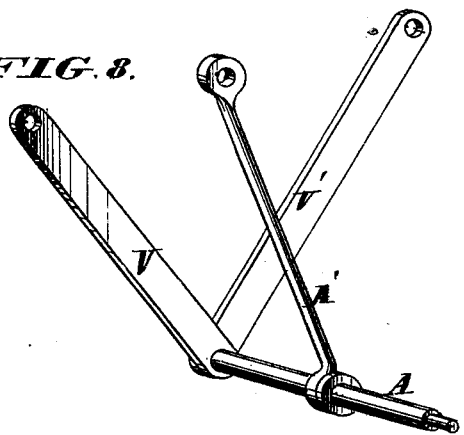
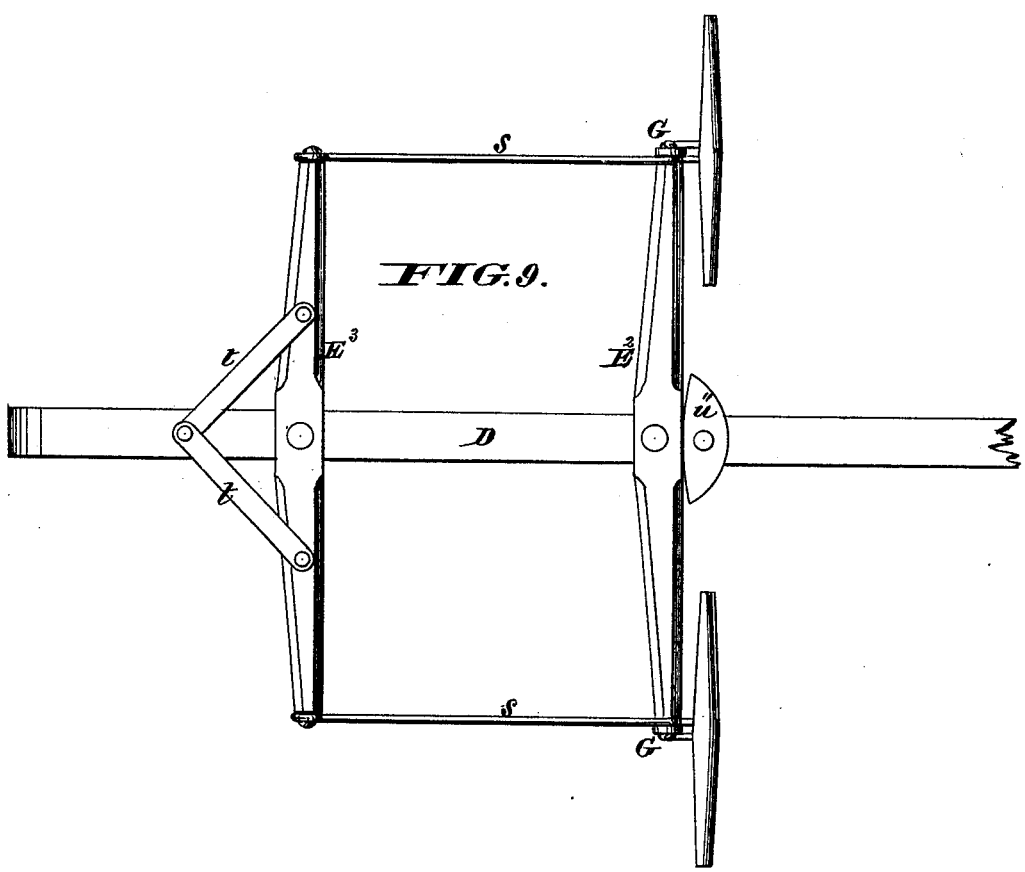
WITNESSES
INVENTOR
Oliver C. Green
By Knight Bros Attorneys 4 Sheets—Sheet 4.

O. C. GREEN.
WHEEL-CULTIVATOR.

No. 175,077. Patented March 21, 1876.

WITNESSES
Chas. J. Gooch
Le Blond. Burdett.

INVENTOR
Oliver C. Green
By Knight Bros, Attorneys

N. PETERS, PHOTO-LITHOGRAPHER, WASHINGTON, D.C.

UNITED STATES PATENT OFFICE.

OLIVER C. GREEN, OF DUBLIN, INDIANA, ASSIGNOR TO CASPER GREEN AND JOHN GREEN, OF SAME PLACE.

IMPROVEMENT IN WHEEL-CULTIVATORS.

Specification forming part of Letters Patent No. 175,077, dated March 21, 1876; application filed February 15, 1876.

*To all whom it may concern:*

Be it known that I, OLIVER C. GREEN, of Dublin, in the county of Wayne and State of Indiana, have invented a new and useful Improvement in Wheel-Cultivators, of which the following is a specification:

This invention relates to an improvement in cultivating corn and other growing crops, and to those implements of this general class which have swinging tongues or poles to provide for working close to fences, and for turning within a small space with facility.

One object of the invention is to prevent interference between the wheels and rear draft apparatus applied to a swinging tongue. This is accomplished by locating the pivot of the tongue as far back as the axle, and the main double-tree, hitch-bars, and single-trees in front and outside of the frame and wheels, so that the single-trees shall swing around the wheels in curves of long radius.

Another object of the invention is to relieve the center bolt or pivot of the swinging tongue from undue strain. This is accomplished by extending the tongue in rear of its pivot, and by combining with the extended tongue a flat frame, affording supports or bearings in front and in rear of the pivot beneath the tongue.

Another object of the invention is to provide, by simple means, for locking the tongue in central position. This part of the invention consists in combining, with the pivoted tongue, a transverse rocking bar, constructed with a mortise pivoted between the frame-bars, and provided with a gravitating-arm, $p$.

Figure 1:
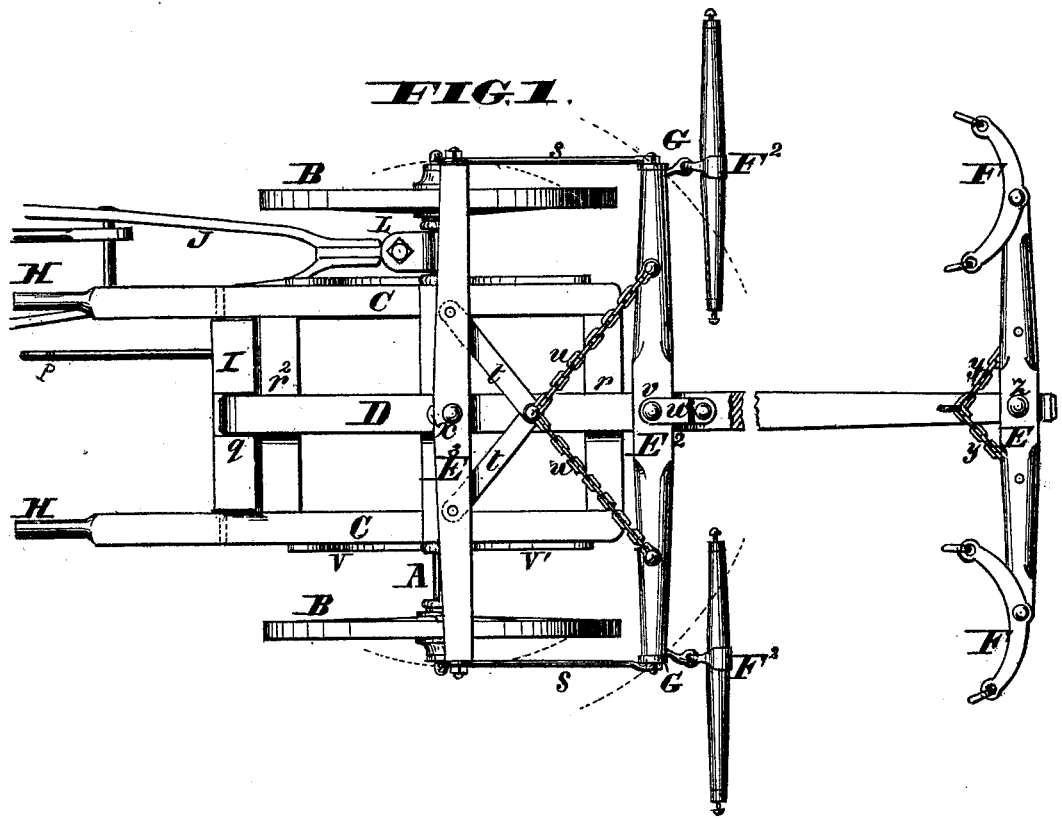
Figure 2:
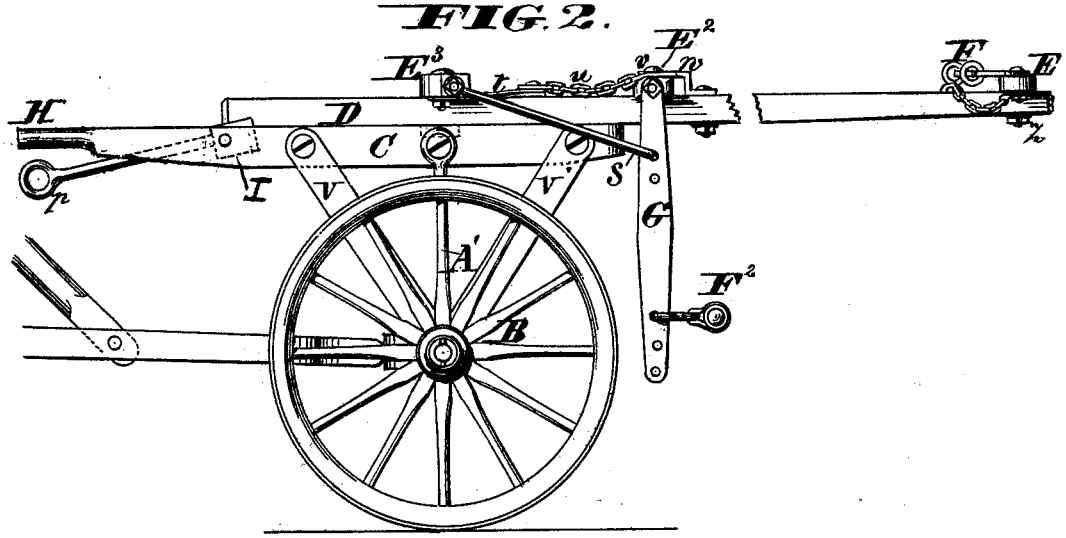
Figure 10:
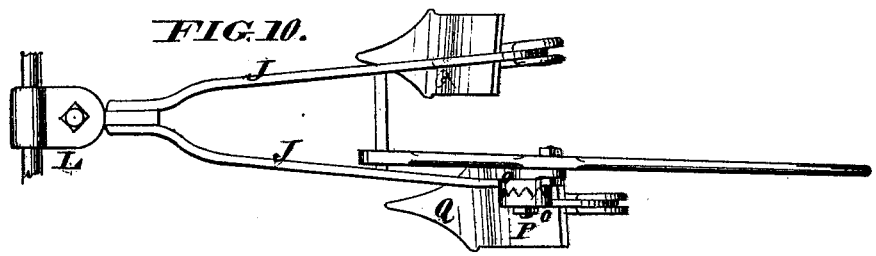
Figure 11:
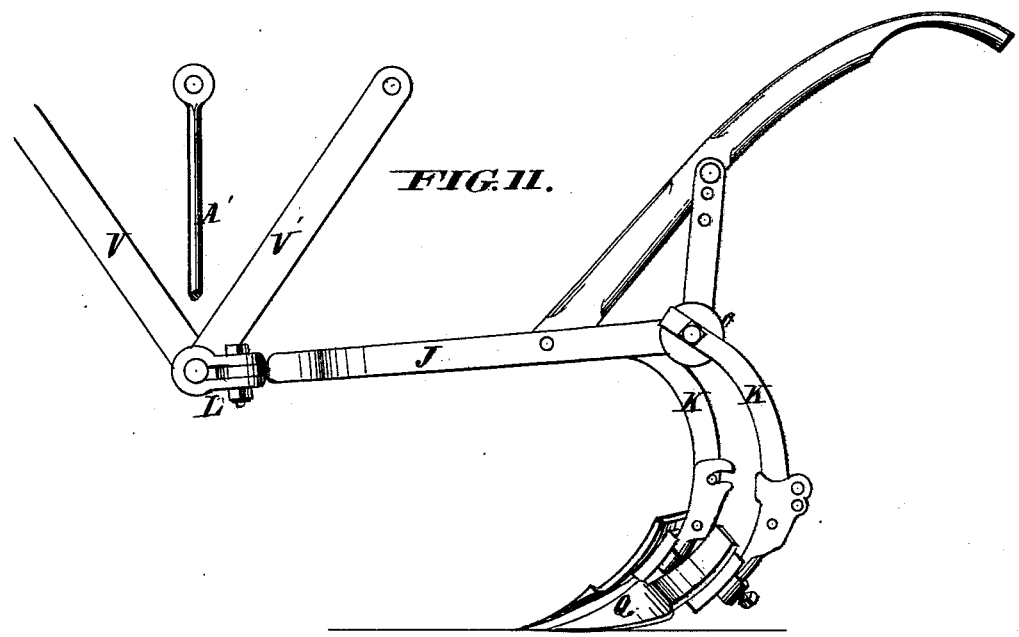
Figure 13:
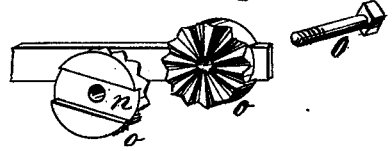
Figure 12:
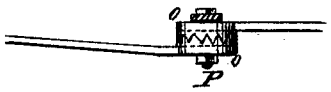

In the accompanying drawings, Figure 1 is a top view of a wheeled frame and draft apparatus of a cultivator or corn-plow. Fig. 2 is a side elevation of the same. Fig. 3 is a rear view thereof. Fig. 4 is a vertical longitudinal section in a central plan. Fig. 5 is a partial longitudinal section, illustrating a modification. Fig. 6 is a top view, and Fig. 7 is a side view, illustrating another modification. Fig. 8 is a perspective view, showing the axle and frame supports. Fig. 9 is a top view, illustrating another modification. Fig. 10 is a top view of the plow, showing my improved joint applied on the outside of the beam. Fig. 11 is a side view of the same with the frame-support. Fig. 12 is a top view of the joint applied on the inside of the beam. Fig. 13 is a perspective view of the joint, the plates being separated.

Like letters of reference indicate corresponding parts in the several figures.

A wheel-cultivator or corn-plow constructed according to this invention has an axle, A, wheels B B, an elevated horizontal frame, C, and a laterally-swinging tongue, D, which parts, broadly considered, are old and well known. The frame C is attached by each side to the inner ends of the axle A by means of two bars, V V', forming V-shaped supports, and the portion of the frame over the axle is rigidly secured to the axles inside of the ground-wheels B by braces A', which keep the frame and axle from sagging down. At the extremity of the tongue or draft-pole, in front of the horses, a double-tree, E, is attached by a bolt, $z$, and stay-chains $y$, and this front double-tree is furnished with single-trees F, suitably curved to adapt them for direct attachment to the hames of the horses. This arrangement of a double-tree provides for applying draft in the most direct manner possible, and precludes any interference between the single-trees and the ground-wheels. The swinging tongue is attached to the frame by a center bolt or pivot, $x$, perpendicular to the axes of the ground-wheels, and located some distance back from the front of the frame. The same bolt $x$, or one at or near the same, serves, by preference, for the attachment of one of a pair of rear draft double-trees, $E^2$ $E^3$. The first of these, $E^2$, is, preferably, attached to the top of the tongue, in front of the frame, by a clip, $w$, bolt $v$, and stay-chains $u$, and the second, $E^3$, is stayed rigidly at right angles to the tongue by plate-links $t$. The bolt $v$ is surrounded by an elastic pad, $v''$, which prevents the tongue from jarring. This preferred arrangement of the double-trees is illustrated in Figs. 1 to 4, and substitute arrangements are illustrated in Figs. 5, 6, 7, and 9. In the first modification the arrangement is the same, except that the main rear draft double-tree is attached to the bottom of the tongue. In the second modification the second double-tree $E^3$ is arranged directly above the first. This arrangement of rear draft double-trees in either modification of the same locates these parts outside of the frame and above the wheels, so that they are not liable to come in contact with the latter. In Fig. 9 the plate-links $t$ are in rear of the rear double-tree $E^3$, and instead of stay-chains I provide a block, $w''$, pivoted to the tongue in front of the rear double-tree $E^2$. Hitch-bars G are pivoted to the respective ends of the main rear draft double-tree $E^2$, and depend therefrom, and are connected in the preferred arrangement, Figs. 1 to 4, by rods $s$, to the ends of the second double-tree $E^3$, these rods being attached to the hitch-bars below the first double-tree $E^2$. In the first modification, Fig. 5, the hitch-rods are extended upward, and the connecting-rods are applied between their upper ends and the second double-tree. In the second modification, Figs. 6 and 7, the rods are dispensed with, the hitch-bars being pivoted to the ends of both double-trees, and the lower double-tree rigidly braced to the tongue by plate-links $t'$. The rear draft single-trees $F^2$ $F^2$ are attached to the lower ends of the hitch-bars, which thus afford low hitching-points in line between the plows and the horses' shoulders. Multiplied perforations provide for adjusting these single-trees as to height. As thus located and supported, the single-trees are adapted to travel around and outside of the ground-wheels without striking them, while all necessary play for equalizing the draft is afforded.

The extended lower end of the center bolt $v$ of the main rear draft double-tree $E^2$ limits the lateral movements of the tongue by coming in contact with the front of the frame. The swinging tongue D is, by preference, extended in length, and its pivot $x$ is located in front of its rear end. The horizontal frame C affords bearings or supports, $r$ $r^2$, in front and in rear of the tongue-pivot, beneath the tongue, as thus extended, and the pivot is thereby released from undue strain, and rendered strong and secure. The side bars of the frame are extended behind to form guiding-handles H H, and between these a transverse latch, I, is pivoted, to provide for holding and releasing the swinging tongue. The latch has a notch, $q$, to engage with the extended rear end of the tongue, and a gravitating-arm or thumb-extension, $p$, convenient to one handle, by which to operate the latch to release the tongue preliminary to turning. The double-tree E, at the front end of the tongue or draft-pole, may be employed in combination with the described rear draft apparatus, or with a simple artificial double-tree behind, serving for the attachment of cords or straps at the sides of the horses to keep them in position. L is a clevis, by which the plow is attached to the axle. J are plow-beams, and K the standards. The standards K, which may be either straight or crooked, are adapted to be attached on either side of the plow-beams by means of a joint consisting of two removable plates, $o$ $o$, each plate being provided with serrations on the inside, radiating from the center to the circumference, and on the outside with a groove or channel, $n$, for the reception of the plow-beam or standard. The bolt O, passing axially through the joint, forms a pivot or hinge, on which one plate carrying the standard can turn when out of mesh with the serrations on the opposite plate, for the purpose of adjusting the shovels Q. The bolt is secured by a nut, P.

If it is desired to place the shovels Q nearer together, the joint can be applied to the inside of the beam, as illustrated in Fig. 12.

Having thus described my invention, the following is what I claim as new therein, and desire to secure by Letters Patent:

1. A swinging tongue, D, having its pivot $x$ above the axle-tree, and perpendicular to the axes of the ground-wheels, as herein described, in combination with a main rear draft double-tree, $E^2$, hitch-bars G, and single-trees $F^2$, supported in front and outside of the frame and wheels, so as to travel around the wheels without interference when the tongue is turned in either direction.

2. A swinging tongue, D, having its pivot above the axle-tree, and perpendicular to the axes of the ground-wheels, in combination with a horizontal frame, C, affording extended supports or bearings, $r$ $r^2$, beneath the tongue, in front and in rear of the pivot, as herein shown and described, for the purpose specified.

3. The combination of the swinging tongue D, the rear draft double-trees $E^2$ $E^3$, stayed at about right angles thereto, the low hitch-bars G, pivoted to the ends of one of these double-trees, and connected to the other by rods $s$, and the single-trees $F^2$ $F^2$, attached to the hitch-bars, substantially as herein shown and described.

4. The rocking bar I, constructed with a mortise, $q$, pivoted between the frame-bars C, and provided with the gravitating-arm $p$, in combination with the pivoted tongue D, as and for the purpose set forth.

OLIVER C. GREEN.

Witnesses:
CYRUS T. SWAIN,
AMOS D. SMITH.